UNITED STATES PATENT OFFICE.

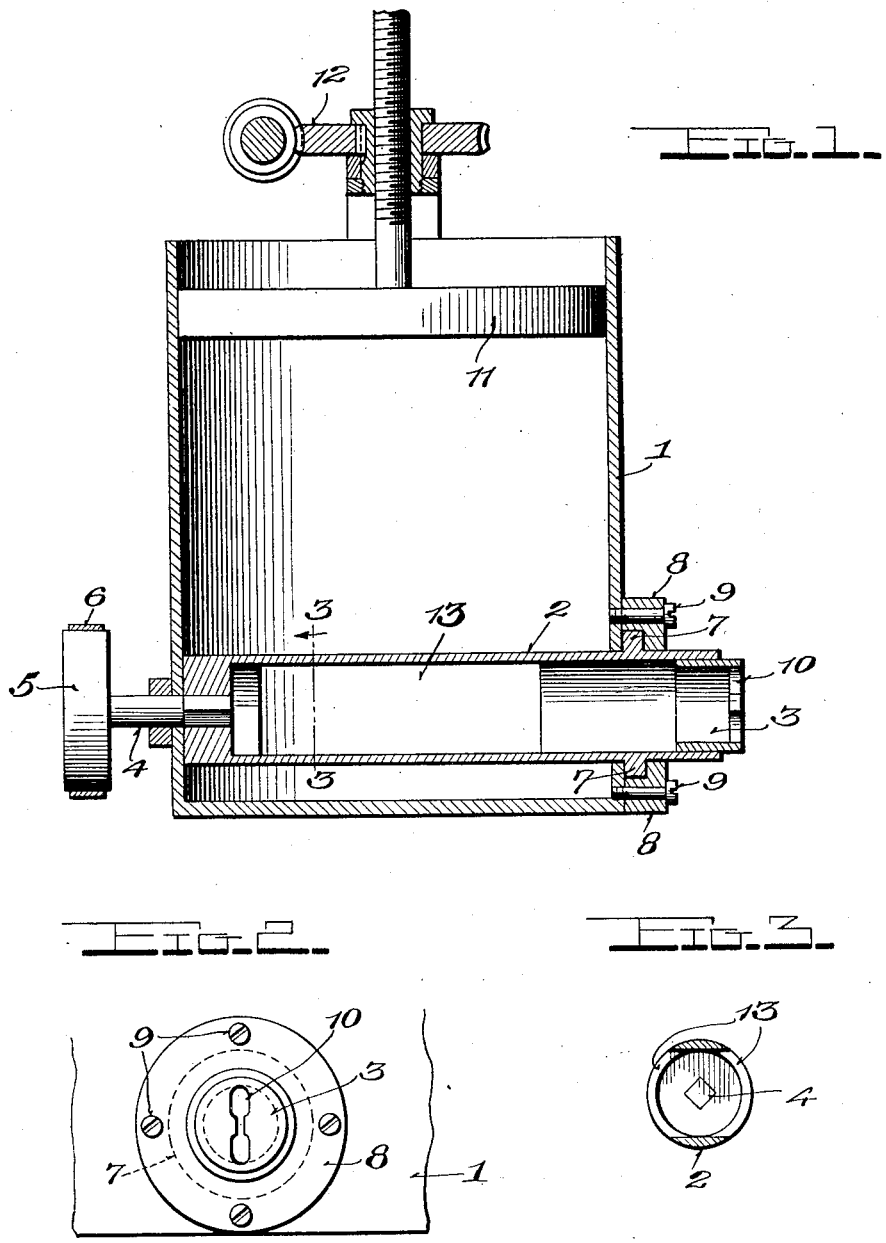

FREDERICK L. BRADBURY, OF BRIDGEPORT, CONNECTICUT.

CRULLER-FORMING DIE.

1,340,371.   Specification of Letters Patent.   Patented May 18, 1920.

Application filed June 18, 1919. Serial No. 305,065.

*To all whom it may concern:*

Be it known that I, FREDERICK L. BRAD-BURY, a citizen of the United States, residing at the city of Bridgeport, in the county of Fairfield and State of Connecticut, have invented certain new and useful Improvements in Cruller-Forming Dies; and I do declare the following to be a full, clear, and exact description of the invention, such as will enable others skilled in the art to which it appertains to make and use the same.

This invention relates to certain new and useful improvements in a cruller forming die, the principal object of the invention being to provide a structure in which the cruller-forming dough is shaped and twisted as it is fed from a supply and thereby facilitate the forming of crullers and also economize in the production thereof by combining the several operations into a single, mechanically performed act.

The invention consists in a revolving hollow die through which the dough is axially expressed in the desired shape, the rotation of the die imparting an axial twist to the dough as it leaves the discharge end of the die and falls upon a suitable carrier or receptacle for cooking.

Further, the invention consists in the features of construction and the arrangements and combinations of parts herein after described and claimed, reference being made to the accompanying drawing wherein, Figure 1 is a vertical section through the improved construction;

Fig. 2 is an end elevation of the twister die, and

Fig. 3 is a transverse section therethrough on line 3—3 of Fig. 1.

Referring to Fig. 1, the dough-containing receptacle 1 is provided in its lower portion with an outlet constituting a journal bearing for one end of the twisting and shaping die which comprises a tubular or hollow body 2 having its exposed end opened for the reception of a shaping plug or forming die 3 and its inner end closed except for a rectangular axial opening to receive the squared end of a shaft 4 that is journaled in the opposite side of the receptacle and constitutes a support for the inner end of the die body. On the outer end of the shaft is fixed a pulley 5 designed to be driven by a belt 6 for imparting rotation to the twister die.

A peripheral flange 7 on the exposed end of the die body bears against the exterior side of the receptacle and is engaged by the keeper ring or collar 8 which is secured to the side of the receptacle by fasteners 9. The die is thereby held against longitudinal displacement.

The shaping member 3 consists of a hollow plug or nozzle having its end or outer wall formed with a discharge orifice 10 of the desired shape, the configuration depicted giving a flattened or ribbon shape to the dough having thickened edge portions.

In practice, a plunger 11 is forced downwardly into the receptacle by a suitable feed mechanism, as indicated at 12, to subject the underlying dough to pressure and express it into the die body through two diametrically opposed lengthwise slots 13 formed therein. The dough still being under pressure after having entered the revolving die, travels axially and discharges through the shape-imparting orifice 10. As the dough exudes in the form of a ribbon and drops onto a tray or the like (not shown) it is twisted axially by means of the rotating die into the shape of a cruller. When the desired length of dough has been expelled it is severed by any suitable means not shown. The pressure on the dough may be varied and the speed of rotation of the die controlled to obtain variations in the shape.

What is claimed is:

1. A cruller former comprising a receptacle, a tubular die journaled in the lower part thereof and extending through its side, a peripheral flange on the exposed portion of the die, a keeper ring engaged over the flange and secured to the exterior of the receptacle to rotatably retain the die in position, a shaping member inserted in the exposed end of the die and formed with a discharged orifice, said die within the receptacle having diametrical entrance openings through which the dough from the receptacle is forced, an operating shaft secured in the opposite end of the die and extending through the side of the receptacle, and means for subjecting the dough in the latter to pressure.

2. A cruller former comprising a receptacle, a tubular die journaled in the lower part thereof and extending through its side, a peripheral flange on the exposed portion of the die, a keeper ring engaged over the flange and secured to the exterior of the receptacle to rotatably retain the die in position, a shaping member inserted in the exposed end of the die and formed with a discharge orifice, said die within the receptacle having diametrical entrance openings through which the dough from the receptacle is forced, and means for rotating the die.

3. A cruller former comprising a supply receptacle, a tubular die member journaled in one side thereof and extending thereinto toward the opposite side, and means supporting the inner end of the die member and adapted for rotating the same, said die member formed intermediate its ends with means of communication with the interior of the receptacle.

4. A cruller former comprising a receptacle having a lateral discharge opening, a forming die journaled in the opening and extending into the interior of the receptacle, and means at the inner end of the die for supporting and operating the same.

5. A cruller former comprising a receptacle, a tubular die journaled in one side thereof and extending therethrough so as to lie partly within the receptacle, said die having a closed inner end and a lateral inlet communicating with the interior of the receptacle, and means engaged with the inner end of the die for supporting the same.

6. A cruller former comprising a dough container, a rotatable die extending through a wall thereof and formed hollow throughout the outer end portion; the adjacent end wall formed with a shaping discharge orifice, the hollow portion of the die extending into and communicating with the interior of the container, and means connected to the inner end of the die for rotating the same.

7. A cruller former comprising a dough container, a die journaled in and extending through the side thereof, said die being hollow throughout one end portion and having a radial passage located within communicating with the interior of the container, and means connected to the end of the die within the container for rotating the die.

8. A cruller former comprising a receptacle, a tubular die journaled in the lower part thereof and extending through its side, a shaping member inserted in the exposed end of the die and formed with a discharge orifice, said die within the receptacle having diametrical entrance openings through which the dough from the receptacle is forced, an operating shaft secured in the opposite end of the die and extending through the side of the receptacle, and means for subjecting the dough in the latter to pressure.

9. A cruller former comprising a container, and a forming die journaled at its opposite ends therein and having an axial dough passage communicating with the interior of the container through a lateral opening within the container and between the journaled ends of the die.

10. A cruller former comprising a container, a tubular die journaled therein and extending thereacross, and means for rotating the die and supporting it at its inner end.

In testimony whereof I affix my signature in presence of two witnesses.

FREDERICK L. BRADBURY.

Witnesses:
M. M. Bower,
R. C. Williams.